US012652198B2

(12) United States Patent
Han et al.

(10) Patent No.: US 12,652,198 B2
(45) Date of Patent: Jun. 9, 2026

(54) ELECTRONIC DEVICE FOR FEEDING BACK CHANNEL STATE INFORMATION BY USING AUTOENCODER BASED ON MODIFIED SPLIT LEARNING, AND METHOD OF OPERATING THE SAME

(71) Applicant: SAMSUNG ELECTRONICS CO., LTD., Suwon-si (KR)

(72) Inventors: Sangwook Han, Suwon-si (KR); Junho Lee, Suwon-si (KR); Yoojin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/784,145

(22) Filed: Jul. 25, 2024

(65) Prior Publication Data

US 2025/0039019 A1     Jan. 30, 2025

(30) Foreign Application Priority Data

Jul. 25, 2023     (KR) ........................ 10-2023-0097059
Dec. 20, 2023     (KR) ........................ 10-2023-0187527

(51) Int. Cl.
*H04L 25/02*          (2006.01)
*H04L 5/00*           (2006.01)
(52) U.S. Cl.
CPC ........ *H04L 25/0254* (2013.01); *H04L 5/0048* (2013.01)
(58) Field of Classification Search
CPC .............. H04L 25/0254; H04L 5/0048; H04L 25/0224; G06N 3/084; G06N 3/098; G06N 3/0455; G06N 3/0495
See application file for complete search history.

(56) References Cited

U.S. PATENT DOCUMENTS 11,387,880 B2     7/2022  Zeng et al.
2021/0133590 A1   5/2021  Amroabadi et al.
(Continued)

FOREIGN PATENT DOCUMENTS

CN        112580011 A     3/2021
CN        113051617 A     6/2021
(Continued)

OTHER PUBLICATIONS

Otkrist Gupta et al., "Distributed learning of deep neural network over multiple agents," Journal of LATEX Templates, arXiv: 1810. 06060v1 [cs.LG], Oct. 14, 2018 (Total 21 pages).
(Continued)

*Primary Examiner* — David S Huang
(74) *Attorney, Agent, or Firm* — Sughrue Mion, PLLC

(57)     ABSTRACT

A method of operating a base station, includes: transmitting a reference signal to an electronic device comprising a first model and a third model; receiving a first intermediate output from the electronic device; obtaining a second intermediate output by inputting the first intermediate output to a partial model excluding an output layer from a second model comprising a second neural network for data decompression; transmitting the second intermediate output to the electronic device; receiving a first gradient value from the electronic device and updating weight parameters of the partial model; and generating a second gradient value different from the first gradient value and transmitting the second gradient value to the electronic device.

19 Claims, 17 Drawing Sheets

(56) References Cited

U.S. PATENT DOCUMENTS

| | | |
|---|---|---|
| 2022/0060235 A1 | 2/2022 | Namgoong et al. |
| 2022/0335160 A1 | 10/2022 | Chapman et al. |
| 2022/0366083 A1 | 11/2022 | Parlak et al. |
| 2023/0319617 A1* | 10/2023 | Manolakos .......... G06N 3/0464 |
| | | 370/328 |
| 2023/0354395 A1* | 11/2023 | Park ..................... H04W 72/04 |

FOREIGN PATENT DOCUMENTS

| | | |
|---|---|---|
| CN | 115935408 A | 4/2023 |
| KR | 10-2023-0062108 A | 5/2023 |

OTHER PUBLICATIONS

Zhenyu Liu et al., "Overcoming the Channel Estimation Barrier in Massive MIMO Communication via Deep Learning," IEEE Wireless Communications, Oct. 2020, DOI: 10.1109/MWC.001.1900413 (Total 8 pages).

Maarten G. Poirot et al., "Split Learning for collaborative deep learning in healthcare," 33rd Conference on Neural Information Processing Systems, arXiv: 1912.12115v1 [cs.LG] Dec. 27, 2019 (Total 8 pages).

Yongjun Kim et al., "Channel State Feedback with neural Networks: A Discrete Representation Learning Approach," 2022 IEEE Globecom Workshops (GC Wkshps): Workshop on Emerging Topics in 6G Communications, DOI: 10.1109/GCWkshps56602.2022.10008631, 2022 (Total 6 pages).

Communication issued on Jan. 13, 2025 by European Patent Office in European Application No. 24190721.1.

\* cited by examiner

FIG. 4

ELECTRONIC DEVICE FOR FEEDING BACK CHANNEL STATE INFORMATION BY USING AUTOENCODER BASED ON MODIFIED SPLIT LEARNING, AND METHOD OF OPERATING THE SAME

CROSS-REFERENCE TO RELATED APPLICATION

This application is based on and claims priority under 35 U.S.C. § 119 to Korean Patent Application Nos. 10-2023-0097059, filed on Jul. 25, 2023, and 10-2023-0187527, filed on Dec. 20, 2023, in the Korean Intellectual Property Office, the disclosures of which are incorporated by reference herein in their entireties.

BACKGROUND

1. Field

The disclosure relates to an electronic device for feeding back channel state information (CSI) and a method of operating the electronic device, and more particularly, to an electronic device of feeding back the CSI, by using an autoencoder, based on modified split learning and a method of operating the same electronic device.

2. Description of Related Art

After the commercialization of $4^{th}$ generation (4G) communication systems, $5^{th}$ generation (5G) communication systems and pre-5G communication systems have been developed to meet increasing demands for wireless data traffic. The 5G communication systems are pre-5G communication systems are called 'new radio (NR)' systems in the $3^{rd}$ generation partnership project (3GPP) standard.

To achieve high data transfer rates, the 5G communication systems operate in ultra-high frequency (mmWave) bands (e.g., 28 GHz band, 39 GHz band, etc.). Also, to reduce the path loss of radio waves and increase the transmission distance of radio waves in the ultra-high frequency bands, technologies of beamforming, a massive multiple-input and multiple-output (MIMO), a full dimensional MIMO (FD-MIMO), an array antenna, analog beam-forming, hybrid beamforming, and a large scale antenna have been discussed for the 5G communication systems.

SUMMARY

Provided are an electronic device for performing channel state information (CSI) feedback based on a neural network of an autoencoder for compression and decompression and a method of operating the same electronic device.

According to an aspect of the disclosure, According to an aspect of the disclosure, a method of operating an electronic device, includes: obtaining a channel estimation result, based on a reference signal received from a base station; obtaining a first intermediate output by inputting the channel estimation result to a first model comprising a first neural network for data compression; transmitting, to the base station, the first intermediate output; receiving, from the base station, a second intermediate output different from the first intermediate output; obtaining a decompressed channel estimation result by inputting the second intermediate output to a third model corresponding to an output layer of a second model comprising a second neural network for data decompression; calculating a loss between the obtained channel estimation result and the decompressed channel estimation result by comparing the obtained channel estimation result with the decompressed channel estimation result; transmitting, to the base station, a first gradient value for minimizing the loss; receiving, from the base station, a second gradient value different from the first gradient value; and updating the first model based on the second gradient value.

According to an aspect of the disclosure, a method of operating a base station, includes: transmitting a reference signal to an electronic device comprising a first model and a third model; receiving a first intermediate output from the electronic device; obtaining a second intermediate output by inputting the first intermediate output to a partial model excluding an output layer from a second model comprising a second neural network for data decompression; transmitting the second intermediate output to the electronic device; receiving a first gradient value from the electronic device and updating weight parameters of the partial model; and generating a second gradient value different from the first gradient value and transmitting the second gradient value to the electronic device.

According to an aspect of the disclosure, a method of operating a wireless communication system comprising an electronic device comprising an encoder for data compression and a base station comprising a decoder for data decompression, includes: transmitting, by the base station, a reference signal to the electronic device; obtaining, by the electronic device, a channel estimation result based on the reference signal; inputting, by the electronic device, the channel estimation result to the encoder and obtaining an intermediate output; transmitting, the electronic device, the obtained intermediate output to the base station; and inputting, the base station, the intermediate output to the decoder and obtaining, the base station, a decompressed channel estimation result.

BRIEF DESCRIPTION OF DRAWINGS

Embodiments will be more clearly understood from the following detailed description taken in conjunction with the accompanying drawings in which:

FIG. 4 shows an example of a neural network according to an embodiment;

DETAILED DESCRIPTION

Figure 1:
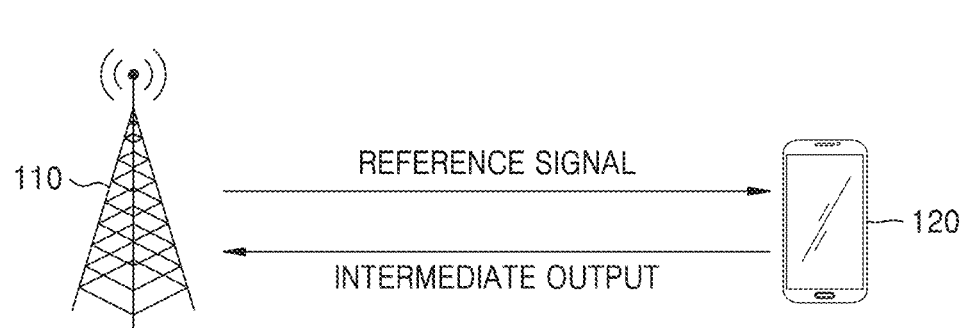
FIG. 1 shows an example of a wireless communication system according to an embodiment.

Hereinafter, embodiments are described in detail with reference to the accompanying drawings. The terms as used in the disclosure are provided to merely describe specific embodiments, not intended to limit the scope of other embodiments. Singular forms include plural referents unless the context clearly dictates otherwise. The terms and words as used herein, including technical or scientific terms, may have the same meanings as generally understood by those skilled in the art. The terms as generally defined in dictionaries may be interpreted as having the same or similar meanings as or to contextual meanings of the relevant art. Unless otherwise defined, the terms should not be interpreted as ideally or excessively formal meanings. Even though a term is defined in the disclosure, the term should not be interpreted as excluding embodiments of the disclosure under circumstances.

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. As an additional example, the expression "at least one of a, b, or c" may indicate only a, only b, only c, both a and b, both a and c, both b and c, all of a, b, and c, or variations thereof. Similarly, the term "set" means one or more. Accordingly, the set of items may be a single item or a collection of two or more items.

Moreover, multiple functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as Read Only Memory (ROM), Random Access Memory (RAM), a hard disk drive, a Compact Disc (CD), a Digital Video Disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

FIG. 1 shows an example of a wireless communication system 10 according to an embodiment.

Referring to FIG. 1, a wireless communication system 10 may include a base station 110 and an electronic device 120. The base station 110 and the electronic device 120 may be illustrated as nodes that use a wireless channel in the wireless communication system 10.

According to an embodiment, the base station 110 may include a network infrastructure that provides wireless access to the electronic device 120. The base station 110 may have a coverage defined as a certain geographic region based on the distance over which signals are transmitted. The base station 110 may be referred to as or correspond to an access point (AP), am eNodeB (eNB), a 5th generation node (5G node), a gNodeB (gNB), a wireless point, or other terms having technical meanings equivalent thereto.

According to an embodiment, the base station 110 may be connected to one or more transmission/reception points (TRPs). The base station 110 may transmit a downlink signal to or receive an uplink signal from the electronic device 120 via the one or more TRPs. For example, the base station 110 may transmit a reference signal (in some cases, RS) to the electronic device 120 to determine the channel environment with the electronic device 120. The reference signal may include a channel state information (CSI) reference signal (RS) (in some cases, CSI-RS or CSI RS). In another example, the base station 110 may receive an 'intermediate output' from the electronic device 120 through which the base station 110 may obtain the CSI. The intermediate output may correspond to the output of an encoder (or an encoding neural network or a compression neural network), located in the electronic device 120, among autoencoders. The intermediate output may be referred to as or correspond to a latent vector, a latent variable, a code, and a feature. The intermediate output includes data for obtaining a channel estimation result by being decompressed through a decoder of the base station 110. The encoder may output the intermediate output when the electronic device 120 receives, as an input, the channel estimation result estimated based on the reference signal. The base station 110 may receive the intermediate output from the electronic device 120 and may input the intermediate output to a decoder (or a decoding neural network or a decompression neural network), located in the base station 110, among the autoencoders to thereby obtain a decompressed channel estimation result.

In other words, the autoencoder may correspond to a neural network for 'compression' and 'decompression.' The autoencoder 'compresses' a channel estimation result input by the electronic device 120 using an encoder model of the electronic device 120, so that the channel estimation result is transmitted to the base station 110 as an intermediate output. And, the autoencoder 'decompresses' the intermediate output using a decoder model of the base station 110 so that the base station 110 obtains the channel estimation result estimated by the electronic device 120.

According to an embodiment, the electronic device 120 may be used by a user and communicate with the base station 110 via a wireless channel. The electronic device 120 may be referred to as or correspond to a terminal, user equipment (UE), a mobile station, a subscriber station, customer premises equipment (CPE), a remote terminal, a wireless terminal, a user device, or other terms having technical meanings equivalent thereto.

According to one or more embodiments, the autoencoder may be based on 'modified split learning.' The 'split learning' may refer to a configuration in which training of the encoder is performed by the electronic device 120 and training of the decoder is performed by the base station 110, independently. On the other hand, the 'modified split learning' may refer to a configuration in which only the output layer of the decoder is separated and trained in the electronic device 120. The modified split learning is described in detail below.

Figure 2:
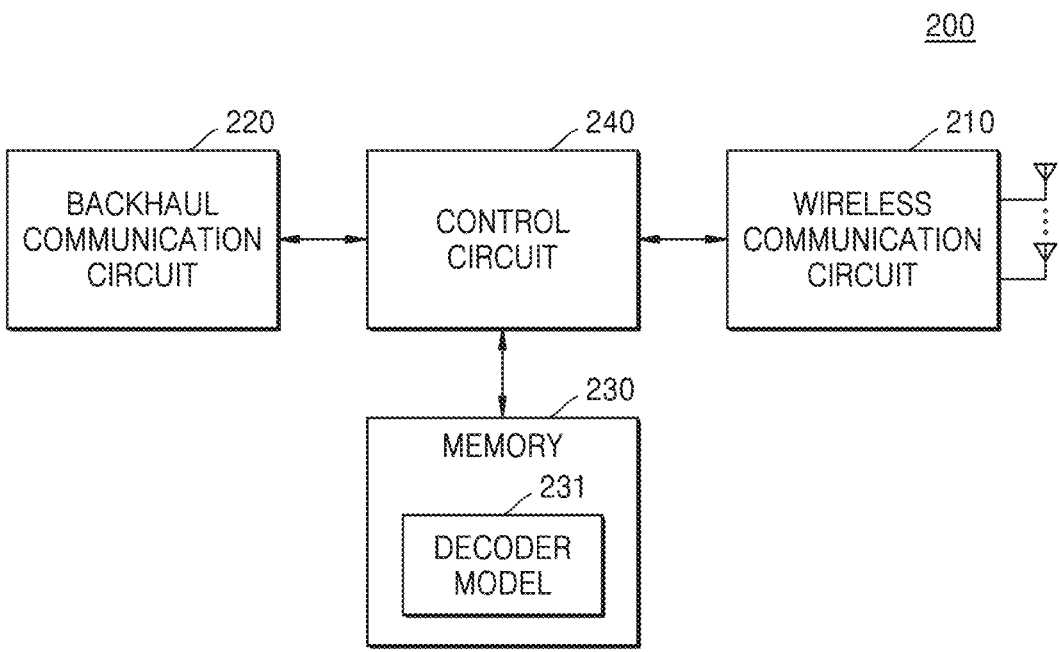
FIG. 2 shows a base station according to an embodiment.

FIG. 2 is a block diagram of the base station 110 according to an embodiment. A base station 200 in FIG. 2 may correspond to the base station 110 in FIG. 1. The base station 200 may include a wireless communication circuit 210, a backhaul communication circuit 220, a memory 230, and a control circuit 240.

According to an embodiment, the wireless communication circuit 210 may perform functions of transmitting and receiving signals through a wireless channel. According to an embodiment, the wireless communication circuit 210 may perform a conversion function between a baseband signal and a bit string according to the physical layer standard of the system. For example, when transmitting data, the wireless communication circuit 210 may generate complex symbols by encoding and modulating the transmitted bit string. Also, when receiving data, the wireless communication circuit 210 may restore the received bit string by demodulating and decoding the baseband signal. In addition, the wireless communication circuit 210 may up-convert the baseband signal into a radio frequency (RF) band signal and then transmit the RF band signal through an antenna or may down-convert the RF band signal received through the antenna into a baseband signal. In some embodiments, the wireless communication circuit 210 may include a transmission filter, a reception filter, an amplifier, a mixer, an oscillator, a digital-to-analog convertor (DAC), an analog-to-digital convertor (ADC), etc.

The wireless communication circuit 210 may transmit and receive signals. For example, the wireless communication circuit 210 may transmit a synchronization signal (SS), a reference signal, system information, a message, control information, or data. In addition, the wireless communication circuit 210 may perform beamforming. The wireless communication circuit 210 may apply beamforming weights to signals so as to provide directionality to signals to be transmitted and received. The wireless communication circuit 210 may change the formed beam and transmit signals repeatedly.

According to an embodiment, the backhaul communication circuit 220 provides an interface for communicating with other nodes in the network. That is, the backhaul communication circuit 220 may convert a bit string, which is transmitted from the base station 200 to another node (for example, another access node, another base station, a higher node, a core network, etc.), into a physical signal and may convert the physical signal, which is received from the another node, into a bit string.

According to an embodiment, the memory 230 stores data, such as basic programs, application programs, and setting information, for operation of the base station 200. Throughout the disclosure, the memory 230 may refer to or correspond to at least one memory or at least one memory device.

The memory 230 may include a volatile memory, a non-volatile memory, or a combination of the volatile memory and the non-volatile memory. According to an embodiment, the memory 230 may include a decoder model 231. The decoder model 231 may include weight parameters of a plurality of layers constituting a neural network that receives the intermediate output from an electronic device (e.g., the electronic device 120 of FIG. 1) as an input. The decoder model 231 may decompress the intermediate output, and may output the decompressed channel estimation result.

The decoder model 231 may include various types of models, such as a convolution neural network (CNN) (e.g., GoogleNet, AlexNet, VGG Network, etc.), a region with convolution neural network (R-CNN), a regional proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, and a classification network. However, the embodiment is not limited to the aforementioned models. The decoder model 231 may correspond to relevant software, software codes, at least one code, at least one application, at least one program, or at least one computer program code.

The control circuit 240 may control the operations of the base station 200. Throughout the disclosure, the control circuit 240 may refer to or correspond to at least one control circuit or at least one processor.

For example, the control circuit 240 transmits and receives signals through the wireless communication circuit 210 or the backhaul communication circuit 220. Also, the control circuit 240 may write data to and read data from the memory 230. In some embodiments, the control circuit 240 may include at least one processor. For example, the control circuit 240 may include at least one of a central processing unit (CPU), a neural processing unit (NPU), and a graphics processing unit (GPU). The control circuit 240 may perform training of a decoder model or inference of a decoder model depending on operation modes.

For example, in a training phase, the control circuit 240 may sequentially calculate and store intermediate parameters starting from an input layer of the decoder model, based on the intermediate output received from the electronic device 120. Also, the control circuit 240 may update weight parameters through back-propagation based on a gradient value.

In an inference phase, the control circuit 240 may sequentially calculate intermediate parameters starting from an input layer of the decoder model, based on the intermediate output received from the electronic device and the control circuit 240 may obtain a decompressed channel estimation result, which is the final output.

Figure 3:
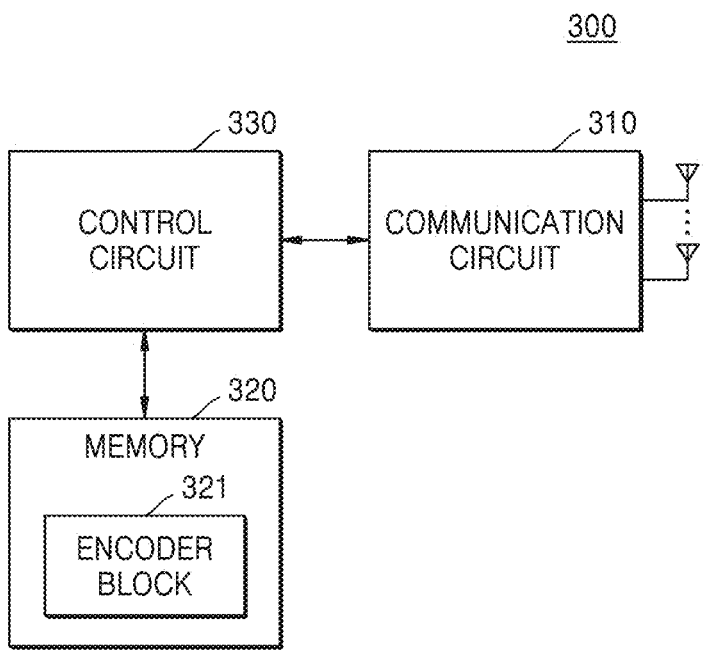
FIG. 3 shows an electronic device according to an embodiment.

FIG. 3 is a block diagram of an electronic device 300 according to an embodiment. Referring to FIG. 3, the electronic device 300 may include a communication circuit 310, a memory 320, and a control circuit 330. The electronic device 300 may correspond to the electronic device 120 of FIG. 1.

According to an embodiment, the communication circuit 310 performs functions of transmitting and receiving signals through a wireless channel. For example, the communication circuit 310 performs a conversion function between a baseband signal and a bit string according to the physical layer standard of the system. For example, when transmitting data, the communication circuit 310 may generate symbols by encoding and modulating the transmitted bit string. Also, when receiving data, the communication circuit 310 may restore the received bit string by demodulating and decoding the baseband signal. In addition, the communication circuit 310 may up-convert the baseband signal into an RF band signal and then transmit the RF band signal through an antenna or may down-convert the RF band signal received through the antenna into a baseband signal. For example, the communication circuit 310 may include a transmission filter, a reception filter, an amplifier, a mixer, an oscillator, a DAC, an ADC, etc. The communication circuit 310 may perform beamforming. The communication circuit 310 may apply beamforming weights to signals so as to provide directionality to signals to be transmitted and received.

According to an embodiment, the communication circuit 310 may transmit and receive signals. The communication circuit 310 may receive a downlink signal. The downlink signal may include an SS, an RS, system information, a configuration message, control information, or downlink data. In addition, the communication circuit 310 may transmit an uplink signal. The uplink signal may include a random access-related signal, a reference signal (e.g., a sounding reference signal (SRS), a DM-RS, a phase tracking RS (PT-RS)), or uplink data including CSI feedback information.

According to an embodiment, the memory 320 may store data, such as basic programs, application programs, and setting information, for operation of the electronic device 300. Throughout the disclosure, the memory 320 may refer to or correspond to at least one memory or at least one memory device.

The memory 320 may include a volatile memory, a non-volatile memory, or a combination of the volatile memory and the non-volatile memory. Also, the memory 320 may provide the stored data in response to a request from the control circuit 330. According to an embodiment, the memory 320 may include an encoder model 321. The encoder model 321 may include weight parameters of a plurality of layers constituting a neural network that receives, as an input, a channel estimation result obtained by performing channel estimation based on a reference signal received from a base station (e.g., the base station 110 of FIG. 1). The encoder model 321 compresses the channel estimation result to generate an intermediate output. The encoder model 321 may include various types of models, such as a CNN (e.g., GoogleNet, AlexNet, VGG Network, etc.), an R-CNN, an RPN, an RNN, an S-DNN, an S-SDNN, a deconvolution network, a DBN, an RBM, a fully convolutional network, an LSTM network, and a classification network. However, the embodiment is not limited to the aforementioned models.

Also, the encoder model 321 and the decoder model constituting the autoencoder are not limited to the same model. According to one or more embodiments, the encoder model may be different from the decoder model. For example, the encoder model may be based on a CNN and the decoder model may be based on an LSTM network.

The control circuit 330 may control all operations of the electronic device 300. Throughout the disclosure, the control circuit 330 may refer to or correspond to at least one control circuit or at least one processor.

For example, the control circuit 330 may transmit and receive signals through the communication circuit 310. Also, the control circuit 330 may write data to and read data from the memory 320. To this end, the control circuit 330 may include at least one processor or microprocessor or may be part of a processor. When the control circuit 330 is part of a processor, part of the communication circuit 310 and the control circuit 330 may be referred to as a communication processor (CP). According to an embodiment, the control circuit 330 may include at least one of a CPU, an NPU, and a GPU. The control circuit 330 may perform training of an encoder model or inference of an encoder model depending on operation modes.

For example, in a training phase, the control circuit 330 may sequentially calculate and store intermediate parameters starting from an input layer of the encoder model on the basis of the channel estimation result. Also, the control circuit 330 may update weight parameters through back-propagation based on a gradient value.

In an inference phase, the control circuit 330 may sequentially calculate intermediate parameters starting from an input layer of the encoder model on the basis of the channel estimation result and may generate and deliver an intermediate output, which is the final output, to the base station 110. The base station 110 may obtain a decompressed channel estimation result based on the decoder model using the intermediate output as an input.

Figure 4:
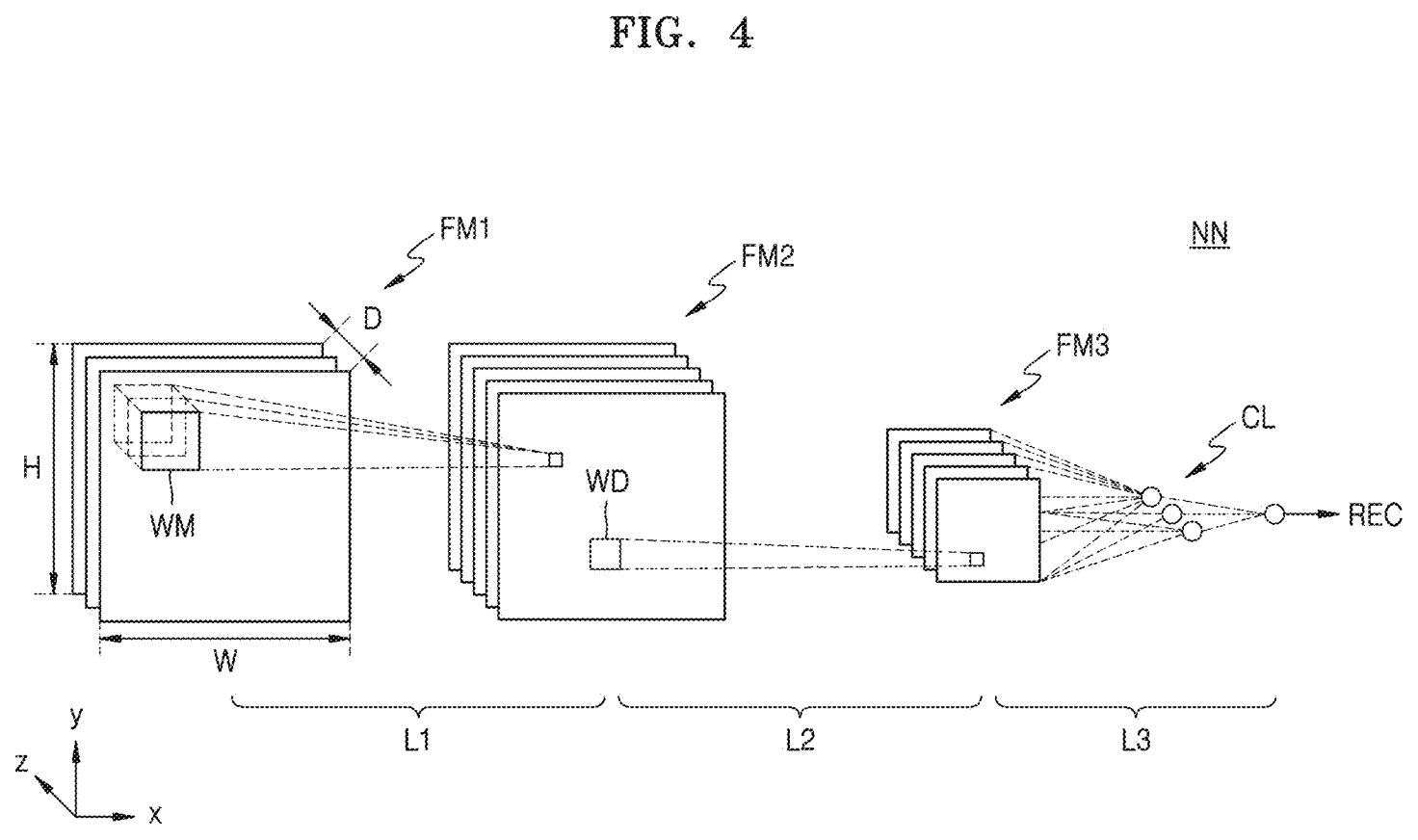

FIG. 4 is an example of a neural network NN according to an embodiment.

Referring to FIG. 4, the neural network NN may correspond to each of the decoder model 231 in FIG. 2 and the encoder model 321 in FIG. 3. The neural network NN may include a plurality of layers L1 to Ln. Each of the plurality of layers L1 to Ln may include a linear layer or a non-linear layer. According to an embodiment, at least one linear layer and at least one non-linear layer may be coupled to each other and be referred to as a single layer. For example, a linear layer may include a convolution layer or a fully connected layer, and the non-linear layer may include a sampling layer, a pooling layer, and an activation layer.

For example, a first layer L1 may include a convolution layer and a second layer L2 may include a sampling layer. The neural network NN may further include an activation layer and hidden layers that perform different types of operations.

Each of the plurality of layers L1 to Ln may receive input image data or a feature map generated in a previous layer, as an input feature map, and generate an output feature map by calculating the input feature map. Also, the feature map refers to data that expresses various characteristics of input data. Each of feature maps FM1, FM2, and FM3 (or referred to as first to third feature maps FM1 to FM3) may be provided as, for example, a 2-dimensional matrix or a 3-dimensional matrix. The first to third feature maps FM1 to FM3 may have a width W (or column), a height H (or row), and a depth D, which may correspond to an x-axis, a y-axis, and a z-axis of the coordinate system, respectively. Also, the depth D may be referred to as a number of channels.

The first layer L1 may generate the second feature map FM2 by convolving the first feature map FM1 with a weight map WM. The weight map WM may filter the first feature map FM1 and be, thus, referred to as a filter or kernel. For example, the depth of the weight map WM, i.e., the number of channels, may be the same as the depth of the first feature map FM1, i.e., the number of channels. The same channels of the weight map WM) and the first feature map FM1 may be convolved with each other. The weight map WM is shifted by crossing the first feature map FM1 as a sliding window. The amount of shift may be referred to as a "stride length" or "stride." During each shift, each of weights in the weight map WM may be multiplied and added to all feature values in a region overlapping the first feature map FM1. When the first feature map FM1 and the weight map WM are convolved with each other, one channel of the second feature map FM2 may be created. Although a single weight map WM is illustrated in FIG. 4, substantially, a plurality of weight maps may be convolved with the first feature map FM1 to generate a plurality of channels of the second feature map FM2. In other words, the number of channels of the second feature map FM2 may correspond to the number of weight maps.

The second layer L2 may generate the third feature map FM3 by changing the spatial size of the second feature map FM2. For example, the second layer L2 may include a sampling layer. The second layer L2 may perform up-sampling or down-sampling and may select some of the data of the second feature map FM2. For example, a window WD in 2 dimensions may be shifted on the second feature map FM2 in units of the size of the window WD (e.g., 4×4 matrix) and select a value at a specific position (e.g., the first row and first column) in the region overlapping the window WD. The second layer L2 may output the selected data as data of the third feature map FM3. In another example, the second layer L2 may include a pooling layer. In this case, the second layer L2 may select the maximum value of the feature values (or the average value of the feature values) in the region overlapping the window WD in the second feature map FM2. The second layer L2 may output the selected data as data of the third feature map FM3.

Accordingly, the third feature map FM3 having a changed spatial size may be generated from the second feature map FM2. The number of channels of the third feature map FM3 may be equal to the number of channels of the second feature map FM2. Also, according to an embodiment, the computation speed of the sampling layer may be faster than that of the pooling layer. The sampling layer may improve the quality of an output image (e.g., in terms of a peak signal-to-noise ratio (PSNR)). For example, in calculations using the pooling layer, the maximum or average value may be calculated. Therefore, the computation time using the pooling layer may be longer than that using the sampling layer.

According to an embodiment, the second layer L2 is not limited to the sampling layer or the pooling layer. That is, the second layer L2 may include a convolution layer similar to the first layer L1. The second layer L2 may generate the third feature map FM3 by convolving the second feature map FM2 with a weight map. In this case, the weight map (on which the convolution operation has been performed on the second layer L2) may be different from the weight map WM on which the convolution operation has been performed on the first layer L1.

An N-th feature map may be created in an N-th layer through the plurality of layers including the first layer L1 and the second layer L2. The N-th feature map may be input to a reconstruction layer located at the back end of an artificial neural network through which output data is output. The reconstruction layer may generate an output image based on the N-th feature map. In addition, the reconstruction layer may receive the N-th feature map and the plurality of feature maps, such as the first feature map FM1 and the second feature map FM2. The reconstruction layer may generate the output image, based on the plurality of feature maps.

The third layer L3 may generate output data by combining features of the third feature map FM3. For example, the output data may include data obtained when the compressed input data is decompressed.

10

Figure 5:
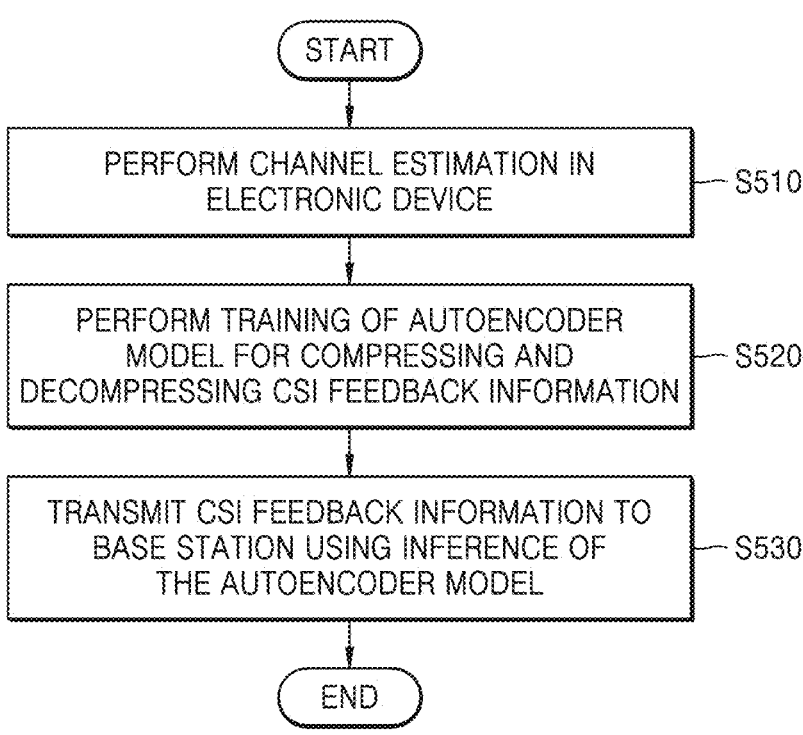
FIG. 5 shows a method of operating the wireless communication system, according to an embodiment.

FIG. 5 is a flowchart showing a method of operating the wireless communication system 10, according to an embodiment.

Referring to FIG. 5, in operation S510, an electronic device (e.g., the electronic device 120 in FIG. 1) of a wireless communication system (e.g., the wireless communication system 10 in FIG. 1) may perform channel estimation. For example, the electronic device 120 may receive a reference signal for channel estimation from a base station (e.g., the base station 110 in FIG. 1) and obtain a channel estimation result based on the reference signal.

In operation S520, an autoencoder (or autoencoder model), which performs compression and decompression for CSI feedback, may be trained. For example, the autoencoder may include an encoder model for compressing input data and a decoder model for decompressing compressed input data. The encoder model may be provided in the electronic device 120. The decoder model may be provided in the base station 110. Also, as shown in FIG. 3, the encoder model 321 is included in the electronic device 300 and the decoder model 231 is included in the base station 200.

The electronic device 120 may train the encoder model by using, as an input, the channel estimation result obtained in operation S510. The encoder model may generate an intermediate output corresponding to the channel estimation result. The electronic device 120 may transmit the intermediate output to the base station 110 and train the decoder model of the base station 110.

According to an embodiment, a head model of the autoencoder may be included in the electronic device 120 during the training process. The head model may include at least one output layer of the decoder model. That is, the head model may include at least one layer that generates a decompressed channel estimation result in the decoder model.

During the training process, the decoder model of the base station 110 may include only the remaining layers excluding at least one output layer. Therefore, during the training process, a signal output from the decoder model of the base station 110 (or the decoder model 231 in FIG. 2) may include an intermediate output rather than a decompressed channel estimation result. Hereinafter, an intermediate output, which is output from the encoder model of the electronic device 120, is referred to as a 'first' intermediate output. Another intermediate output, which is output from the decoder model of the base station 110, is referred to as a 'second' intermediate output.

The base station 110 may deliver the second intermediate output to the electronic device 120. The electronic device 120 may receive the second intermediate output from the base station 110 and train the head model using the second intermediate output as an input. The output of the head model may be a result of decompressing the channel estimation result that is estimated by the electronic device 120 and compressed by the encoder model.

The electronic device 120 may calculate a loss through compression and decompression by comparing the output of the head model to a pre-estimated channel estimation result. The electronic device 120 may generate a gradient value for updating the weight parameter based on the loss. However, since a previous (or before) layer of the head model exists in the decoder model of the base station 110, the electronic device 120 may transmit the gradient value to the base station 110. The base station 110 may update the weight parameters of the decoder model on the basis of the gradient value.

Similarly, since the previous layer of the decoder model exists in the encoder model of the electronic device 120, the gradient value may be provided to the electronic device 120 again. Also, the gradient value for updating the weight parameter of the decoder model may be referred to as a 'first' gradient value, and the gradient value for updating the weight parameter of the encoder model may be referred to as a 'second' gradient value. The electronic device 120 may receive the second gradient value from the base station 110 and update the weight parameter of the encoder model on the basis of the second gradient value. When the training is completed, the electronic device 120 may provide the head model of the electronic device 120 to the base station 110. This is because the base station 110 may obtain the entire decoder model by concatenating the head model and the decoder model.

In operation S530, the electronic device 120 may transmit CSI feedback to the base station 110 using inference of the autoencoder. Operation S530 may be performed, after the training of the autoencoder is completed in operation S520 and the electronic device 120 transmits the head model to the base station 110. The electronic device 120 may receive a reference signal for CSI, perform channel estimation on the basis of the reference signal, and obtain a channel estimation result. The electronic device 120 may input the channel estimation result into the encoder model of the electronic device 120. The encoder model may generate the intermediate output by compressing the channel estimation result. The electronic device 120 may transmit the intermediate output to the base station 110. The base station 110 may input the intermediate output into the decoder model and obtain the decompressed channel estimation result. Also, the decoder model to which the intermediate output is input may correspond to a model created by concatenating the head model transmitted by the electronic device 120 with the decoder model trained by the base station 110 in S520.

Figure 6A:
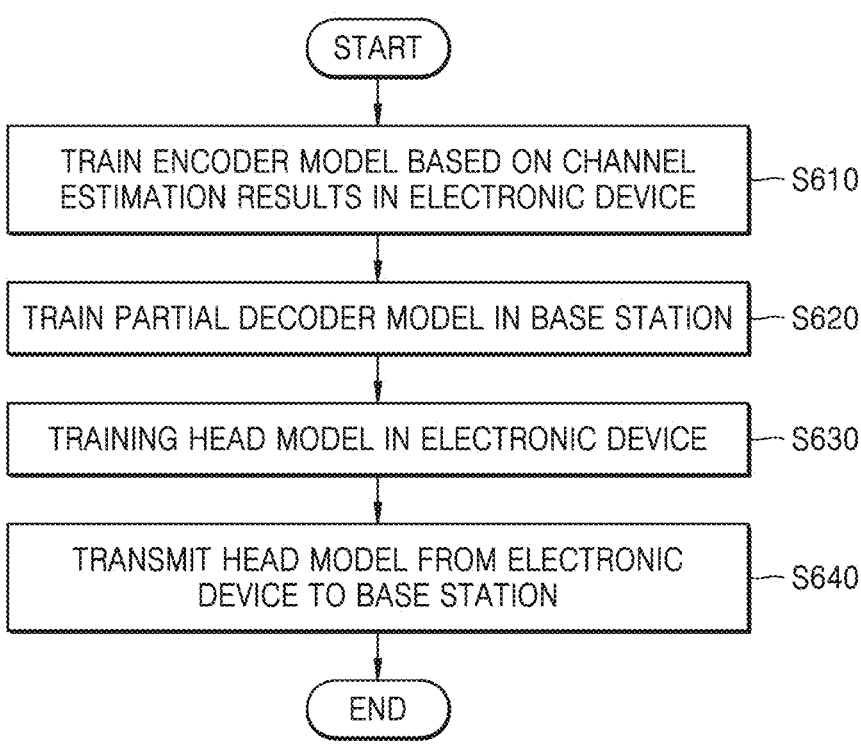
FIG. 6A shows a specific operation method for training an autoencoder, according to an embodiment.
Figure 6B:
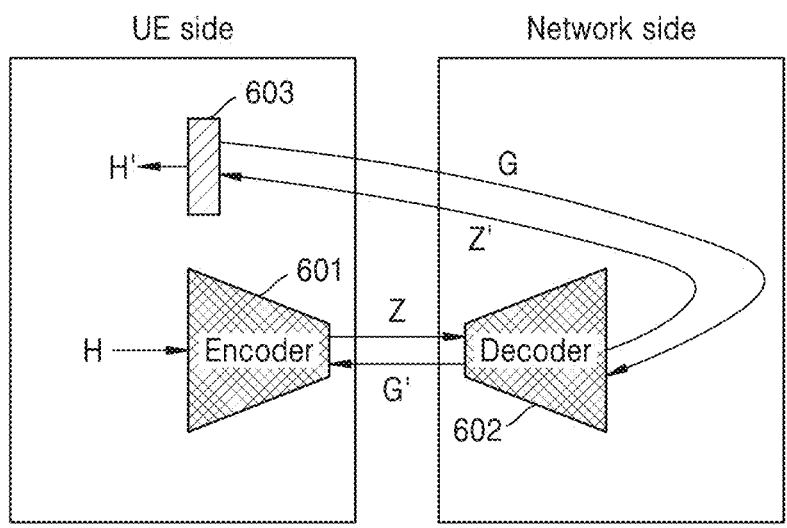
FIG. 6B shows an example of signal exchange in the process of training the autoencoder according to an embodiment.
Figure 7:
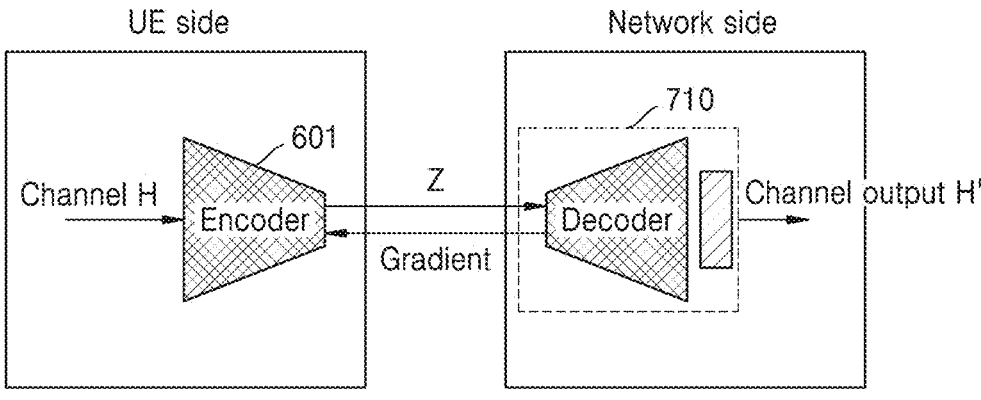
FIG. 7 shows an example of the autoencoder according to an embodiment.

FIG. 6A is a flowchart showing a specific operation method for training an autoencoder, according to an embodiment, FIG. 6B is an example of signal exchange in the process of training the autoencoder according to an embodiment, and FIG. 7 is an example of the autoencoder according to an embodiment.

Referring to FIG. 6A, in operation S610, an electronic device (e.g., the electronic device 120 in FIG. 1) may train an encoder model. Referring to FIG. 6B together, in order to train the encoder model, the electronic device 120 may provide a channel estimation result H, as an input, to the encoder model. The encoder model may correspond to a model 601 (hereinafter, referred to as an encoder model 601). The channel estimation result H may be estimated based on a reference signal (for CSI) received from a base station (e.g., 110 in FIG. 1). The electronic device 120 may provide the channel estimation result H, as an input, to a neural network for compression and may train the encoder model 601 by sequentially calculating and storing intermediate variables starting from an input layer. The channel estimation result H may pass through the encoder model 601 and be converted into a first intermediate output Z. Referring to FIG. 6B together, the first intermediate output Z may be transmitted from the electronic device 120 to the base station 110.

In operation S620, the base station 110 may train a partial decoder model, which may include a model including the remaining layers, other than at least one output layer, of the decoder model for performing decompression. Referring to FIG. 6B together, the partial decoder model may correspond to a model 602 (hereinafter, referred to as a partial decoder model 602). The at least one output layer may correspond to a head model described below and may be trained by the electronic device 120. The base station 110 may receive the first intermediate output Z from the electronic device 120. The first intermediate output Z may correspond to the output of the encoder model 601 of the electronic device 120. In order to train the partial decoder model 602, the base station 110 may use the first intermediate output Z as an input to the partial decoder model 602. The base station 110 may provide the first intermediate output Z as an input to the neural network of the partial decoder model 602 and may train the partial decoder model 602 by sequentially calculating and storing intermediate variables, starting from the input layer of the partial decoder model 602. The output of the partial decoder model 602 may include a second intermediate output that is different from the first intermediate output Z, rather than the decompressed channel estimation result. Referring to FIG. 6B together, the second intermediate output may correspond to a signal Z' (hereinafter, referred to as a second intermediate output Z').

In operation S630, the electronic device 120 may train the head model, which may include at least one output layer of the decoder model. Referring to FIG. 6B together, the head model may correspond to a model 603 (hereinafter, referred to as a head model 603). That is, the head model 603 may be merged with the partial decoder model 602 of the base station 110 so as to form an entire decoder model for decompressing the first intermediate output Z in which the channel estimation result has been compressed. The electronic device 120 may receive the second intermediate output Z' from the base station 110 and train the head model 603 using the second intermediate output Z' as an input. The head model 603 may output a decompressed channel estimation result. Referring to FIG. 6B together, the decompressed channel estimation result may correspond to a signal H' (hereinafter, referred to as a decompressed channel estimation result H'). That is, the decompressed channel estimation result H' may include data obtained by compressing and then decompressing the channel estimation result estimated by the electronic device 120 and may thus not be completely identical to the channel estimation result H. The difference between the channel estimation result H and the decompressed channel estimation result H' may be defined as a loss or error. The electronic device 120 may update the weight parameters of the head model 603, the partial decoder model 602, and the encoder model 601 through error back-propagation and thus complete training (or learning) of the autoencoder once (or 1 epoch). The electronic device 120 may transmit, to the base station 110, a first gradient value obtained by differentiating the function of loss. Referring to FIG. 6B together, the first gradient value may correspond to a signal G (hereinafter, referred to as a first gradient value G). The base station 110 may receive the first gradient value G and update the weight parameter of the partial decoder model 602 so as to minimize the loss. The base station 110 may sequentially update the weight parameters of the layers of the partial decoder model 602 in the reverse direction. For example, the base station 110 may update the weight parameters in a reverse order from a layer that outputs the second intermediate output Z' of the partial decoder model 602 to a layer that receives the first intermediate output Z. The base station 110 may generate a second gradient value and transmit the second gradient value to the electronic device 120. The second gradient value is used to update the weight parameter of the encoder model 601 of the electronic device 120. Referring to FIG. 6B together, the second gradient value may correspond to a signal G' (hereinafter, referred to as a second gradient value G').

The electronic device 120 may receive the second gradient value G' and update the weight parameter of the encoder model 601 so as to minimize the loss. The electronic device 120 may sequentially update the weight parameters of the layers of the encoder model 601 in the reverse direction. For example, the electronic device 120 may update the weight parameters in a reverse order, from a layer that outputs the first intermediate output Z of the encoder model 601 to a layer that receives the channel estimation result.

According to an embodiment, the electronic device 120 may repeat operations S610 to S630 several times. For example, the electronic device 120 may repeat operations S610 to S630 until the loss between the channel estimation result H and the decompressed channel estimation result H' is no longer reduced.

In operation S640, the electronic device 120 may transmit the head model to the base station 110. When the difference between the channel estimation result H and the decompressed channel estimation result H' no longer decreases or is less than or equal to the threshold value, the electronic device 120 may determine that training of the autoencoder for compressing and decompressing the channel estimation result has been completed. The electronic device 120 may transmit the head model 603 to the base station 110 in response to the completion of training (or after the training is completed).

After receiving the head model 603, the base station 110 may generate an entire decoder model 710 by concatenating the head model 603 with the partial decoder model 602 previously stored in the base station 110. According to an embodiment, the entire decoder model 710 is not trained in the base station 110, but the head model 603, which is part of the entire decoder model 710, is trained in the electronic device 120. Accordingly, the loss, which is the difference between the channel estimation result H and the decompressed channel estimation result H', may be calculated inside the electronic device 120. That is, if the head model 603 is not placed in the electronic device 120, the channel estimation result H may be provided to the base station 110 to calculate the loss. However, the channel estimation result H may include personal information that may identify a user of the electronic device 120. If someone else snoops on the channel estimation result H provided to the base station 110, there may be adverse effects on privacy and information security. Accordingly, the head model 603 is placed in the electronic device 120 to improve data privacy.

Referring to FIG. 7, the electronic device 120 may obtain the channel estimation result H by performing channel estimation based on the reference signal for CSI. The electronic device 120 may input the channel estimation result H into the encoder model 601 and generate compressed data of the channel estimation result H. The encoder model 601 may receive an input of the channel estimation result H and output a first intermediate output Z. The first intermediate output Z may correspond to the compressed data. The electronic device 120 may provide the first intermediate output Z to the base station 110. The base station 110 may provide the first intermediate output Z as an input to the entire decoder model 710. The entire decoder model 710 may receive the first intermediate output Z and output a decompressed channel estimation result H'. That is, the electronic device 120 may directly provide the channel estimation result to the base station 110 through CSI feedback based on the autoencoder.

Figure 8:
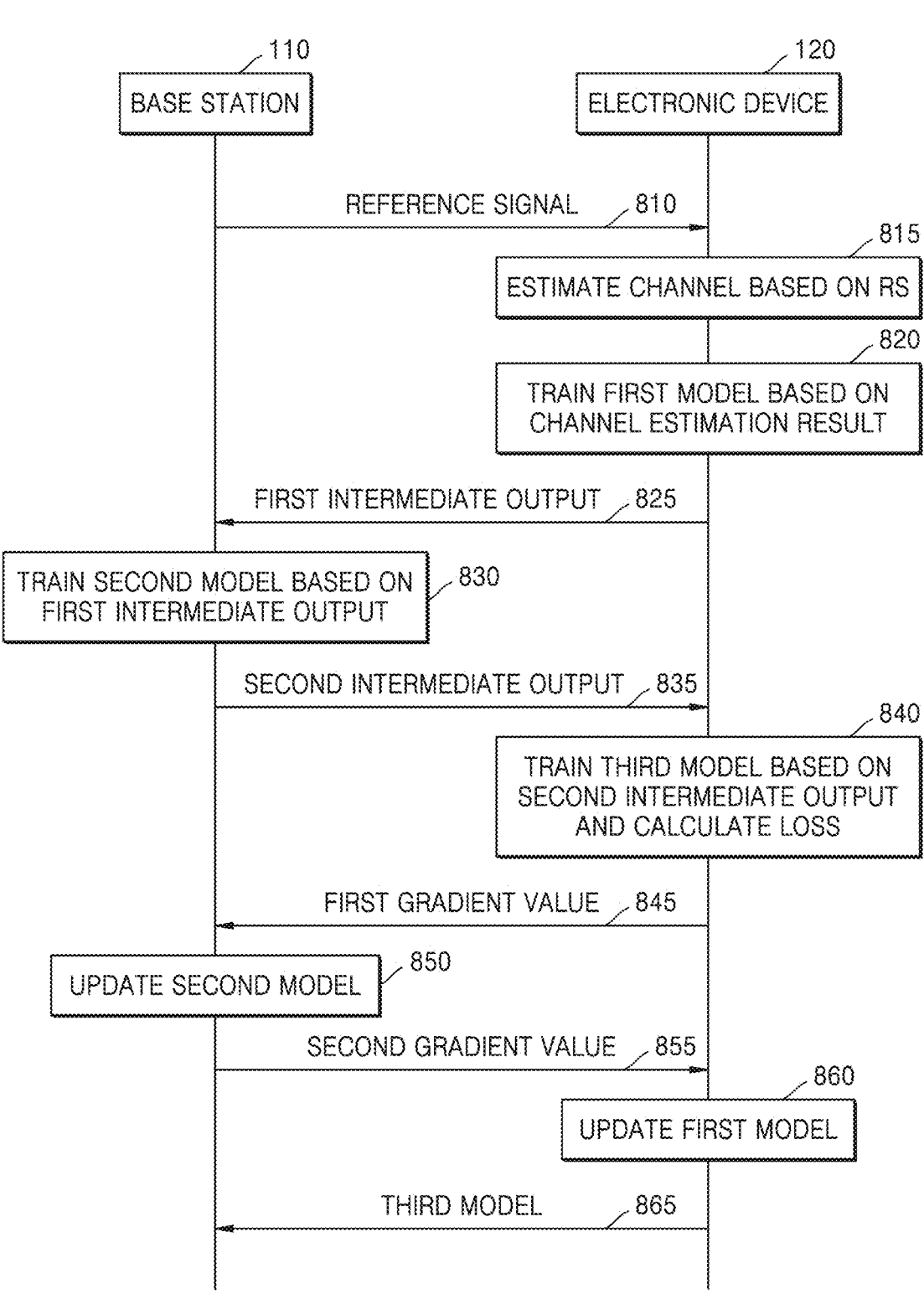
FIG. 8 shows a signal exchange diagram of a wireless communication system according to an embodiment.

FIG. 8 is a signal exchange diagram of a wireless communication system according to an embodiment. Referring to FIG. 8, the base station 110 may transmit a reference signal to the electronic device 120 (operation 810), and the electronic device 120 may perform channel estimation on the basis of the reference signal (operation 815).

The electronic device 120 may perform training of a first model on the basis of the channel estimation result (operation 820). The first model may correspond to the encoder model 601 of FIG. 6B. The electronic device 120 may provide the channel estimation result as an input to the first model for compressing the channel estimation result. The electronic device 120 may generate a first intermediate output by sequentially calculating and storing intermediate parameters starting from an input layer of the first model. The electronic device 120 may transmit the generated first intermediate output to the base station 110 (operation 825). The first intermediate output may correspond to intermediate data for obtaining the channel estimation result when performing decompression through the second model.

The base station 110 may receive the first intermediate output and perform training of the second model on the basis of the first intermediate output (operation 830). The second model may correspond to the partial decoder model 602 of FIG. 6B. The base station 110 may provide the first intermediate output as an input to the second model for decompressing the compressed channel estimation result. The base station 110 may generate a second intermediate output by sequentially calculating and storing intermediate parameters starting from an input layer of the second model. The base station 110 may transmit the generated second intermediate output to the electronic device 120 (operation 835). The second intermediate output may correspond to intermediate data that may obtain a decompressed channel estimation result when passing through an output layer of the decoder model.

The electronic device 120 may perform training of a third model on the basis of the second intermediate output and calculate a loss (operation 840). The third model may correspond to the head model 603 of FIG. 6B. The electronic device 120 may calculate parameters by inputting the second intermediate output into a layer of the third model and may, thus, produce a decompressed channel estimation result. However, if the channel estimation result H is compressed and then decompressed, at least part of the data may change. The electronic device 120 may calculate a loss by comparing the initially estimated channel estimation result with the decompressed channel estimation result and may calculate a first gradient value so as to minimize the loss. The electronic device 120 may transmit the first gradient value to the base station 110 (operation 845). The base station 110 may update the second model on the basis of the first gradient value (operation 850). The update may correspond to adjusting the weight parameters of the second model according to back-propagation, and the update may proceed in a reverse order from the last layer to the first layer of the second model. The base station 110 may calculate a second gradient value so as to minimize the loss. The base station 110 may transmit the second gradient value to the electronic device 120 (operation 855).

The electronic device 120 may update the first model on the basis of the second gradient value (operation 860). The update may correspond to adjusting the weight parameters of the first model according to back-propagation, and the update may proceed in a reverse order from the last layer to the first layer of the first model. Accordingly, the autoencoder training may be performed once. When training is performed a certain number of times and learning is terminated, the electronic device 120 may provide the third model to the base station 110 (operation 865).

Figure 9:
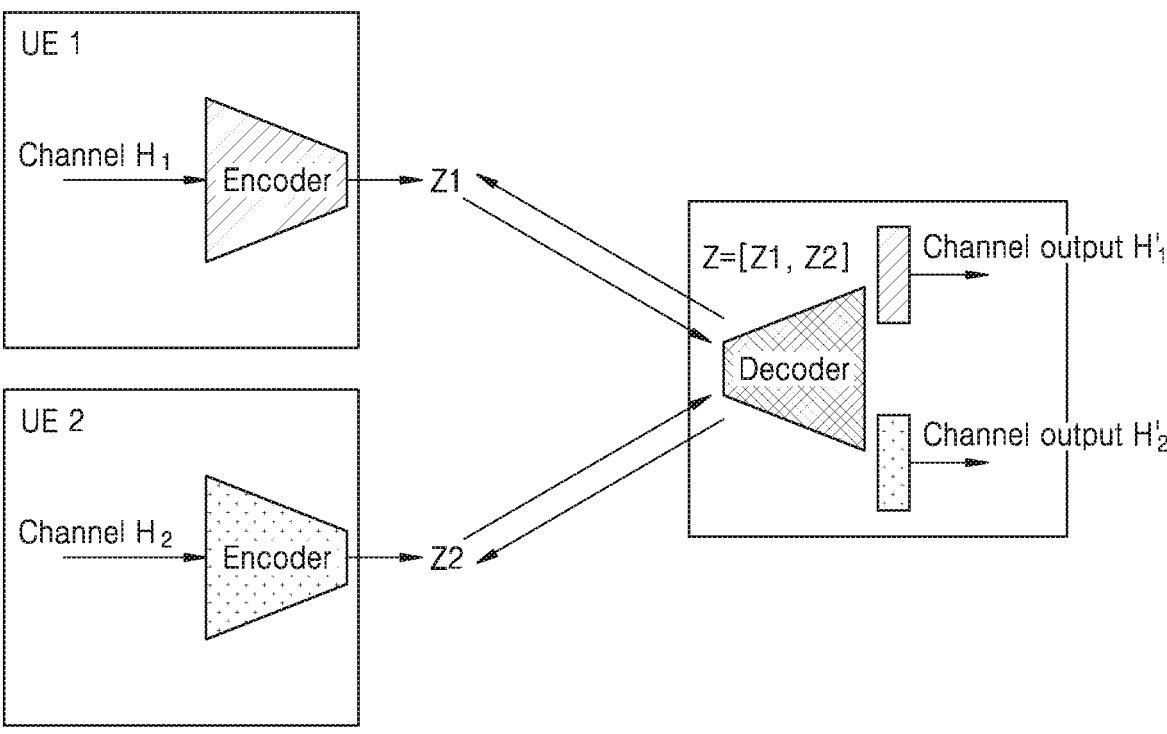
FIG. 9 shows another example of an autoencoder according to an embodiment.

FIG. 9 is another example of an autoencoder according to an embodiment. Referring to FIG. 9, a wireless communication system (e.g., 10 in FIG. 1) may further include an electronic device. For example, the wireless communication system may include a first electronic device UE1, a second electronic device UE2, and a base station. The base station may simultaneously communicate with the first electronic device UE1 and the second electronic device UE2.

According to an embodiment, each of the first electronic device UE1 and the second electronic device UE2 may perform training of an autoencoder in parallel. In other words, the encoder model of the first electronic device UE1 may be trained based on a first channel estimation result H₁ and the encoder model of the second electronic device UE2 may be trained based on a second channel estimation result H₂.

A partial decoder model of the base station may be trained based on both the first channel estimation result H₁ and the second channel estimation result H₂. The partial decoder model of the base station may be applied in common because the partial decoder model is trained using both an intermediate output Z1 received from the first electronic device UE1 and an intermediate output Z2 received from the second electronic device UE2. When the training is completed, the first electronic device UE1 and the second electronic device UE2 may complete the decoder model by both transmitting the head models to the base station. Therefore, the entire decoder model of the base station may include all of the partial decoder model that may be applied, in common, to the first electronic device UE1 and the second electronic device UE2, a first head model for decompressing the intermediate output Z1 of the first electronic device UE1, and a second head model for decompressing the intermediate output Z2 of the second electronic device UE2. The base station may include the entire decoder model that is variably adjustable to a plurality of electronic devices by changing only the head model while maintaining the partial decoder model. For example, when receiving the intermediate output Z1 from the first electronic device UE1, the base station may change the head model to the first head model and input the intermediate output Z1 to the entire decoder model, thereby decompressing the channel estimation result compressed by the first electronic device UE1. For example, when receiving the intermediate output Z2 from the second electronic device UE2, the base station may change the head model to the second head model and input the intermediate output Z2 to the entire decoder model, thereby decompressing the channel estimation result compressed by the second electronic device UE2.

Figure 10:
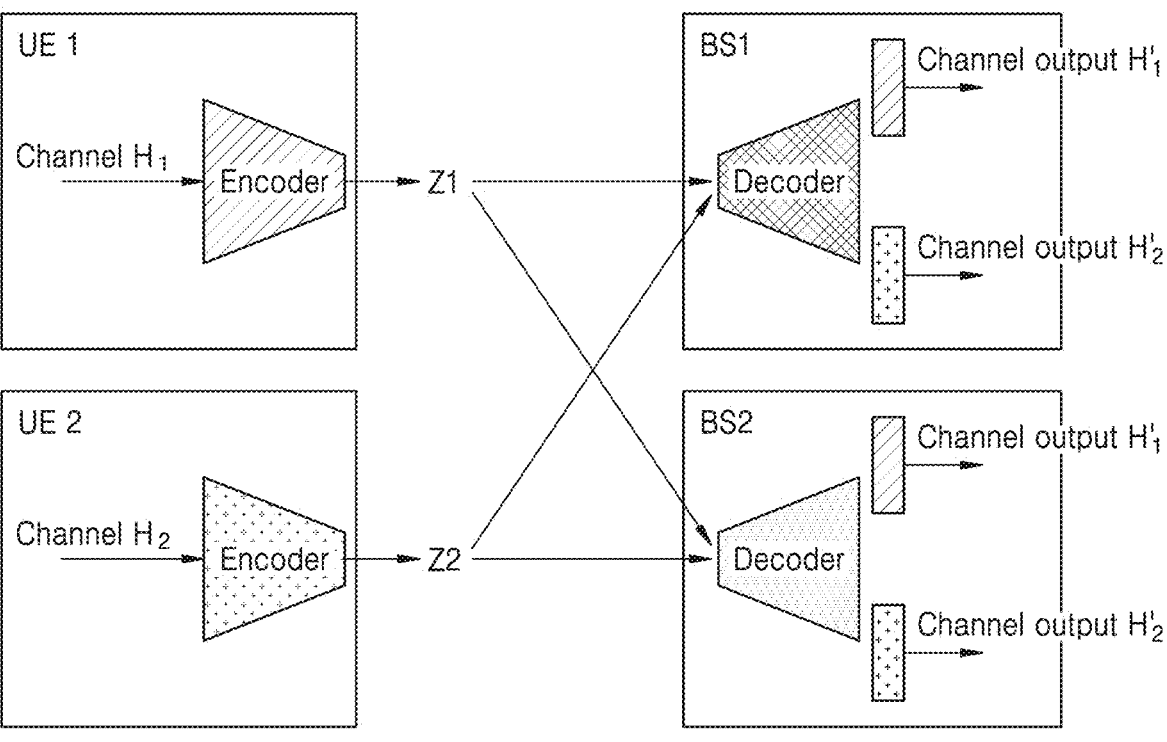
FIG. 10 shows another example of an autoencoder according to an embodiment.

FIG. 10 is another example of an autoencoder according to an embodiment. Referring to FIG. 10, a wireless communication system (e.g., 10 in FIG. 1) may include a first electronic device UE1, a second electronic device UE2, a first base station BS1, and a second base station BS2. Each of the first base station BS1 and the second base station BS2 may simultaneously communicate with the first electronic device UE1 and the second electronic device UE2.

According to an embodiment, each of the first electronic device UE1 and the second electronic device UE2 may perform training of an autoencoder in parallel. In other words, the encoder model of the first electronic device UE1 may be trained based on a first channel estimation result H₁ and the encoder model of the second electronic device UE2 may be trained based on a second channel estimation result H₂.

A partial decoder model of each of the first base station BS1 and the second base station BS2 may be trained based on both the first channel estimation result H₁ and the second channel estimation result H₂. The partial decoder model of the first base station BS1 may be applied, in common, to the first electronic device UE1 and the second electronic device UE2 because the partial decoder model is trained using both an intermediate output Z1 received from the first electronic device UE1 and an intermediate output Z2 received from the second electronic device UE2.

The partial decoder model of the second base station BS2 may be applied, in common, to the first electronic device UE1 and the second electronic device UE2 because the partial decoder model is trained using both the intermediate output Z1 received from the first electronic device UE1 and the intermediate output Z2 received from the second electronic device UE2. When the training is completed, the first electronic device UE1 and the second electronic device UE2 may complete the decoder model by respectively transmitting the head models to the base station. Therefore, the entire decoder model of each of the first base station BS1 and the second base station BS2 may include all of the partial decoder model that may be applied, in common, to the first electronic device UE1 and the second electronic device UE2, a first head model for decompressing the intermediate output Z1 of the first electronic device UE1, and a second head model for decompressing the intermediate output Z2 of the second electronic device UE2. Each of the first base station BS1 and the second base station BS2 may include the entire decoder model that is variably adjustable to a plurality of electronic devices by changing only the head model while maintaining the partial decoder model.

For example, when receiving the intermediate output Z1 from the first electronic device UE1, the first base station BS1 and the second base station BS2 may change the head model to the first head model and input the intermediate output Z1 into the entire decoder model, thereby decompressing the channel estimation result compressed by the first electronic device UE1. For example, when receiving the intermediate output Z2 from the second electronic device UE2, the first base station BS1 and the second base station BS2 may change the head model to the second head model and input the intermediate output Z2 into the entire decoder model, thereby decompressing the channel estimation result compressed by the second electronic device UE2.

FIGS. 11A to 11E are examples of autoencoders according to comparative examples. While the autoencoder according to the embodiment is trained in both the base station and the electronic device, an autoencoder of FIG. 11A (a comparative example) may be trained in a base station. In this case, the electronic device may transmit the channel estimation result to the base station so as to input the channel estimation result as an input to the encoder model. Accordingly, there is a disadvantage in terms of data privacy. Also, after training is completed in the base station, the encoder model itself may be transmitted to the electronic device. The transmission of the encoder model itself requires a lot of data, which may be a burden on the network.

Figure 11A:
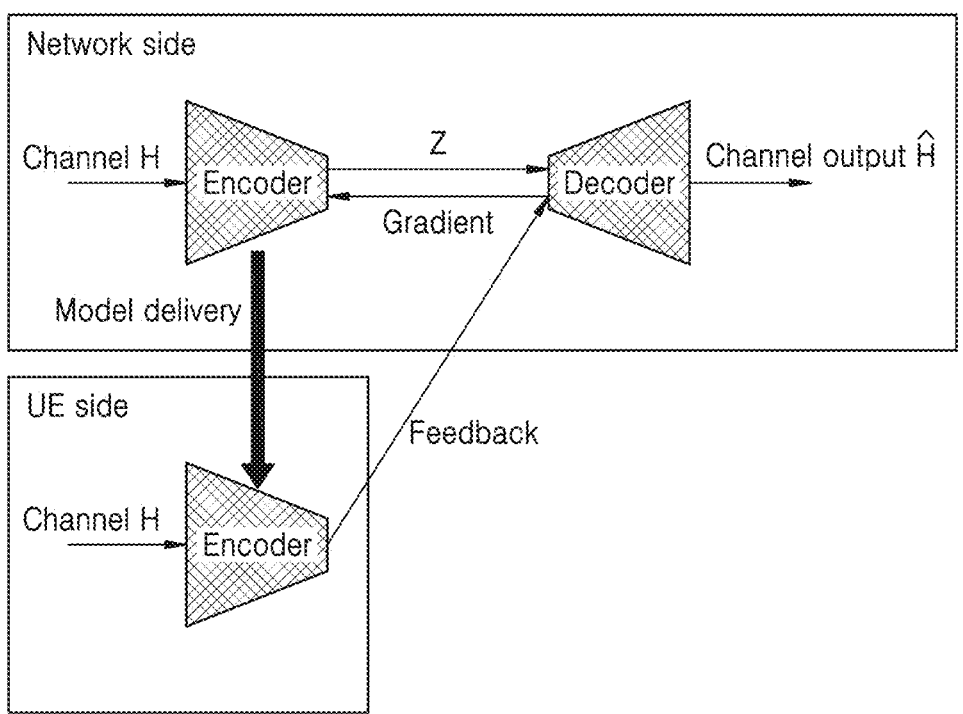
FIGS. 11A to 11E shows examples of autoencoders according to comparative examples.
Figure 11B:
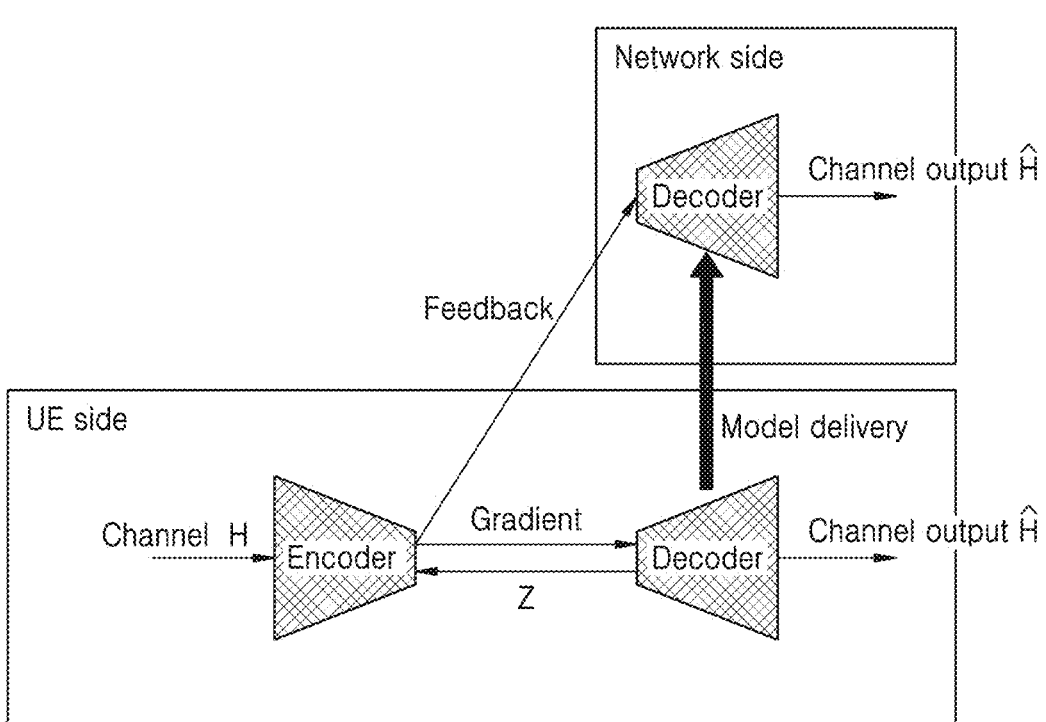

While the autoencoder according to the embodiment of the disclosure is trained in both the base station and the electronic device, an autoencoder of FIG. 11B (a comparative example) may be trained in an electronic device. In this case, after training is completed in the electronic device, the encoder model itself may be transmitted to the base station.

The transmission of the decoder model itself requires a lot of data, which may be a burden on the network.

Figure 11C:
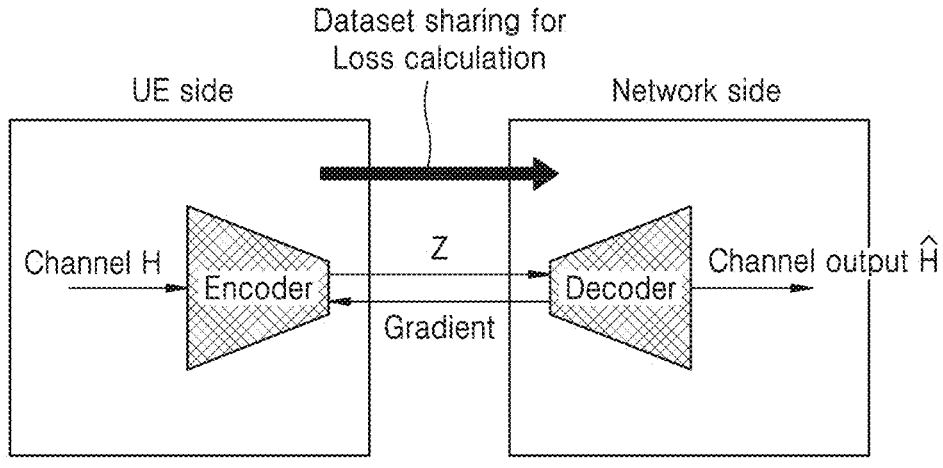

An autoencoder of FIG. 11C (a comparative example) may be based on split learning, similar to the embodiment. That is, an encoder model may be trained in an electronic device and a decoder model may be trained in a base station. In the autoencoder according to the embodiment, the head model is provided in the electronic device so that the electronic device may directly calculate the loss, which is the difference between before and after compression, during the training process. However, in the autoencoder of FIG. 11C, it can be seen that a data set including the channel estimation result is transmitted to the base station in order to calculate the difference between before and after compression. Since the electronic device may transmit the channel estimation result to the base station, there is a disadvantage in terms of data privacy.

Figure 11D:
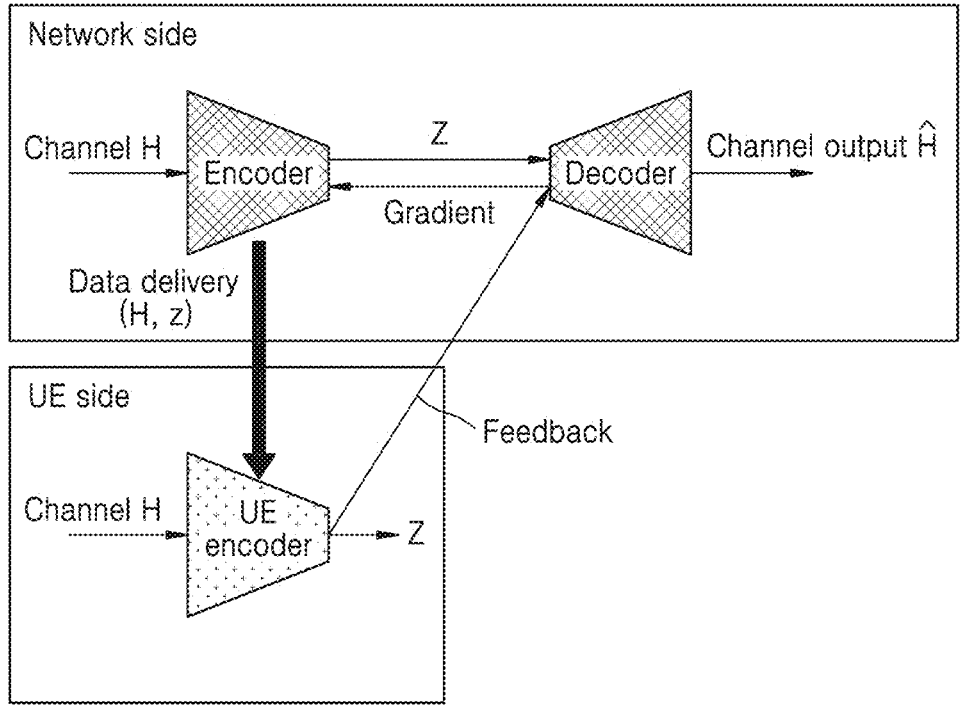

An autoencoder of FIG. 11D (a comparative example) may be based on split learning, similar to the embodiment. However, according to FIG. 11D, a base station may train both an encoder model and a decoder model on the basis of a channel estimation result, and an electronic device may train the encoder model independently of the base station. Sharing of data sets may be required to calculate a loss before and after compression of the channel estimation result. For example, the base station may need to provide the channel estimation result and intermediate output to the electronic device. The transmission of the data set requires a lot of data, which may be a burden on the network.

Figure 11E:
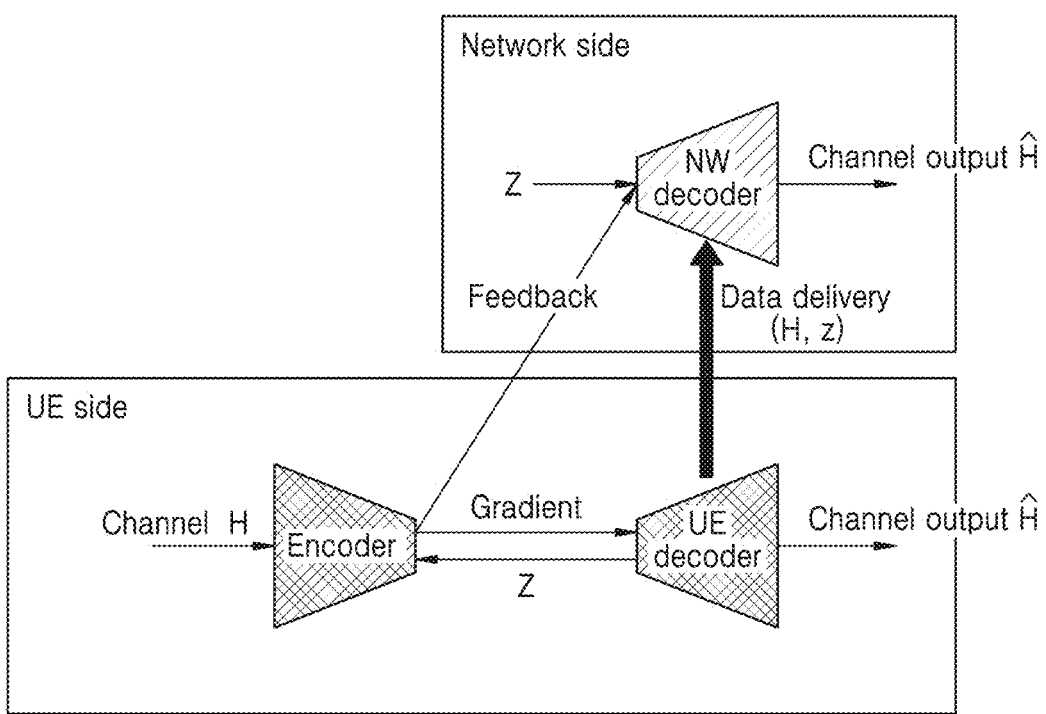

An autoencoder of FIG. 11E (a comparative example) may be based on split learning, similar to the embodiment. However, according to FIG. 11E, an electronic device may train both an encoder model and a decoder model on the basis of a channel estimation result, and a base station may train the decoder model independently of the electronic device. Sharing of data sets may be required to calculate a loss before and after compression of the channel estimation result. For example, the electronic device may need to provide the channel estimation result and intermediate output to the base station. The transmission of the data set requires a lot of data, which may be a burden on the network.

Figure 12:
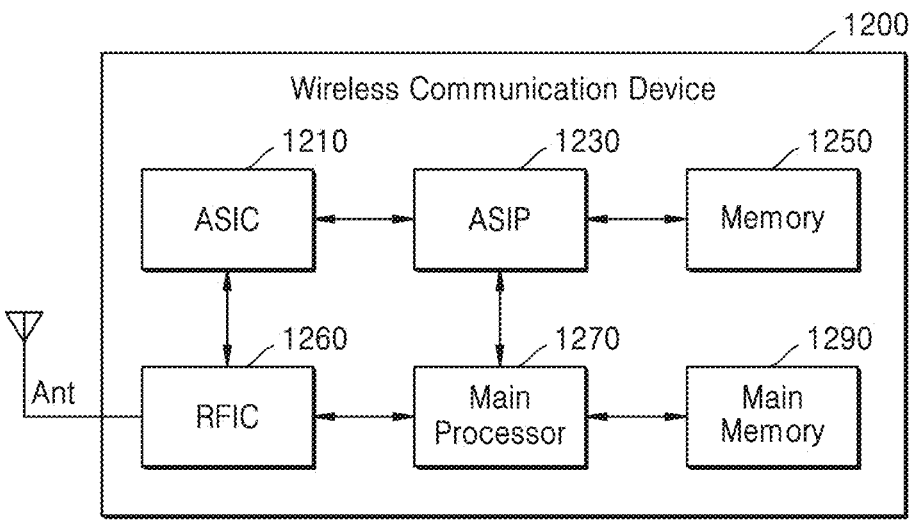
FIG. 12 shows a block diagram of a wireless communication device according to an embodiment.

FIG. 12 is a block diagram of a wireless communication device 1200 according to an embodiment. Referring to FIG. 12, the wireless communication device 1200 may include a modem and a radio frequency integrated circuit (RFIC) 1260. The modem may include an application specific integrated circuit (ASIC) 1210, an application specific instruction set processor (ASIP) 1230, a memory 1250, a main processor 1270, and a main memory 1290. The wireless communication device 1200 of FIG. 12 may include or correspond to the electronic device 120 or the electronic device 300 according to an embodiment.

The RFIC 1260 may be connected to an antenna Ant and receive signals from or transmit signals to the outside using a wireless communication network. The ASIP 1230 may include an integrated circuit customized for a specific purpose and may support a dedicated instruction set for a specific application and execute instructions of the instruction set. The memory 1250 may communicate with the ASIP 1230 and store a plurality of instructions executed by the ASIP 1230 as a non-transitory storage device. For example, the memory 1250 may include, as non-limiting examples, any type of memory accessible by the ASIP 1030, such as random access memory (RAM), read only memory (ROM), tape, a magnetic disc, an optical disc, a volatile memory, a non-volatile memory, and a combination thereof.

The main processor 1270 may control the wireless communication device 1200 by executing a plurality of instructions. Throughout the disclosure, the main processor 1270 may refer to or correspond to at least one control circuit or at least one processor.

For example, the main processor 1270 may control the ASIC 1210 and the ASIP 1230 and may process data received through a wireless communication network or process a user input to the wireless communication device 1200. The main memory 1290 may communicate with the main processor 1270 and store a plurality of instructions executed by the main processor 1270 as a non-transitory storage device. For example, the main memory 1290 may include, as non-limiting examples, any type of memory accessible by the main processor 1270, such as RAM, ROM, tape, a magnetic disc, an optical disc, a volatile memory, a non-volatile memory, and a combination thereof. Throughout the disclosure, the main memory 1290 may refer to or correspond to at least one memory or at least one memory device.

While the disclosure has been particularly shown and described with reference to embodiments thereof, it will be understood that various changes in form and details may be made therein without departing from the spirit and scope of the following claims.

What is claimed is:

1. A method of operating an electronic device, the method comprising:
   obtaining a channel estimation result, based on a reference signal received from a base station;
   obtaining a first intermediate output by inputting the channel estimation result to a first model comprising a first neural network for data compression;
   transmitting, to the base station, the first intermediate output;
   receiving, from the base station, a second intermediate output different from the first intermediate output;
   obtaining a decompressed channel estimation result by inputting the second intermediate output to a third model corresponding to an output layer of a second model comprising a second neural network for data decompression;
   calculating a loss between the obtained channel estimation result and the decompressed channel estimation result by comparing the obtained channel estimation result with the decompressed channel estimation result;
   transmitting, to the base station, a first gradient value for minimizing the loss;
   receiving, from the base station, a second gradient value different from the first gradient value; and
   updating the first model based on the second gradient value.

2. The method of claim 1, further comprising:
   identifying that a difference between the channel estimation result and the decompressed channel estimation result is less than or equal to a threshold value; and
   based on the identifying that the difference between the channel estimation result and the decompressed channel estimation result is less than or equal to the threshold value, transmitting the third model to the base station.

3. The method of claim 1, wherein the base station comprises the second model.

4. The method of claim 3, wherein the second intermediate output corresponds to an output of the second model of the base station.

5. The method of claim 3, wherein the second gradient value is generated based on back-propagation of the second model of the base station.

6. The method of claim 1, wherein an encoder corresponding to the first model corresponds to at least one of a convolution neural network (CNN), a recurrent neural network (RNN), a stacking-based deep neural network (S-DNN), and a long short-term memory (LSTM) network.

7. The method of claim 1, wherein a decoder concatenating the second model with the third model corresponds to at least one of a convolution neural network (CNN), a recurrent neural network (RNN), a stacking-based deep neural network (S-DNN), and a long short-term memory (LSTM) network.

8. A method of operating a base station, the method comprising:
    transmitting a reference signal to an electronic device comprising a first model and a third model;
    receiving a first intermediate output from the electronic device;
    obtaining a second intermediate output by inputting the first intermediate output to a partial model excluding an output layer from a second model comprising a second neural network for data decompression;
    transmitting the second intermediate output to the electronic device;
    receiving a first gradient value from the electronic device and updating weight parameters of the partial model; and
    generating a second gradient value different from the first gradient value and transmitting the second gradient value to the electronic device.

9. The method of claim 8, wherein the first model comprises a first neural network for data compression, and
    wherein the third model corresponds to the output layer of the second model.

10. The method of claim 9, wherein the first intermediate output corresponds to data output by the first model using, as an input, a channel estimation result measured based on the reference signal.

11. The method of claim 9, wherein the first gradient value is generated based on a back-propagation algorithm to minimize a loss calculated by comparing a channel estimation result measured by the electronic device based on the reference signal with a decompressed channel estimation result output by the third model using the second intermediate output as an input.

12. The method of claim 11, further comprising receiving the third model from the electronic device,
    wherein the third model is transmitted based on identifying that a difference between the channel estimation result and the decompressed channel estimation result is less than or equal to a threshold value.

13. The method of claim 8, wherein an encoder corresponding to the first model corresponds to at least a convolution neural network (CNN), a recurrent neural network (RNN), a stacking-based deep neural network (S-DNN), and a long short-term memory (LSTM) network.

14. The method of claim 8, wherein a decoder concatenating the second model with the third model corresponds to at least one of a convolution neural network (CNN), a recurrent neural network (RNN), a stacking-based deep neural network (S-DNN), and a long short-term memory (LSTM) network.

15. A method of operating a wireless communication system comprising an electronic device comprising an encoder for data compression and a base station comprising a decoder for data decompression, the method comprising:
    transmitting, by the base station, a reference signal to the electronic device;
    obtaining, by the electronic device, a channel estimation result based on the reference signal;
    inputting, by the electronic device, the channel estimation result to the encoder and obtaining an intermediate output;
    transmitting, by the electronic device, the obtained intermediate output to the base station; and
    inputting, by the base station, the intermediate output to the decoder, and obtaining, by the base station, a decompressed channel estimation result,
    wherein the method further comprises:
        training, by the electronic device, the encoder, and
        training, by the electronic device, an output layer of the decoder.

16. The method of claim 15, further comprising training, by the base station, the remaining layers of the decoder other than the output layer of the decoder.

17. The method of claim 15, further comprising transmitting the output layer of the decoder to the base station based on a completion of the training of the output layer of the decoder.

18. The method of claim 15, wherein the encoder corresponds to at least one of a convolution neural network (CNN), a recurrent neural network (RNN), a stacking-based deep neural network (S-DNN), and a long short-term memory (LSTM) network.

19. The method of claim 15, wherein the decoder corresponds to at least one of a convolution neural network (CNN), a recurrent neural network (RNN), a stacking-based deep neural network (S-DNN), and a long short-term memory (LSTM) network.

* * * * *